United States Patent
Clayton et al.

(10) Patent No.: US 12,543,018 B2
(45) Date of Patent: Feb. 3, 2026

(54) SYSTEMS AND METHODS FOR LOCATIONING

(71) Applicant: ZEBRA TECHNOLOGIES CORPORATION, Lincolnshire, IL (US)

(72) Inventors: Richard Mark Clayton, Manorville, NY (US); Paul Seiter, Port Jefferson Station, NY (US); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 440 days.

(21) Appl. No.: 18/085,350

(22) Filed: Dec. 20, 2022

(65) Prior Publication Data
US 2024/0205643 A1    Jun. 20, 2024

(51) Int. Cl.
H04W 4/02    (2018.01)
H04W 4/33    (2018.01)
H04W 4/80    (2018.01)

(52) U.S. Cl.
CPC ............. *H04W 4/026* (2013.01); *H04W 4/33* (2018.02); *H04W 4/80* (2018.02)

(58) Field of Classification Search
None
See application file for complete search history.

(56) References Cited

U.S. PATENT DOCUMENTS

2022/0107635 A1*  4/2022  Estep ....................... G05D 1/24
2022/0227612 A1*  7/2022  Kobel ..................... G07C 5/006

FOREIGN PATENT DOCUMENTS

WO    2020/003319 A1    1/2020
WO    2021/152513 A1    8/2021
WO    2022/155540 A1    7/2022

OTHER PUBLICATIONS

Lavagno et al., "Research on Tagless indoor person localization system", Feb. 2022 (Feb. 2022), [Retrieved from online on Apr. 30, 2024 (Apr. 30, 2024)]; [Retrieved from URL: https://webthesis.biblio.polito.it/22676/1/tesi.pdf]; entire document.
International Search Report and Written Opinion for International Application No. PCT/US2023/84208 mailed on Apr. 11, 2024.

* cited by examiner

*Primary Examiner* — Frantz Bataille

(57) ABSTRACT

Systems and methods for determining a position of at least one element are disclosed herein. The system receives, by a device having a first sensor, angle of arrival data from at least one element having a second sensor. The system receives position information of the device within a room and determines a difference in height between the device and the at least one element based on a first pressure measurement of the first sensor and a second pressure measurement of the second sensor. The system generates a vector between the device and the at least one element based on the angle of arrival data and determines a plane indicative of a height of the at least one element based on the determined difference in height. The system determines a position of the at least one element based on an intersection of the vector and the plane.

18 Claims, 4 Drawing Sheets

SYSTEMS AND METHODS FOR LOCATIONING

BACKGROUND

Venues (e.g., warehouses, retail spaces, hospitals, daycares, or the like) often employ technology (e.g., Radio Frequency Identification (RFID) or Bluetooth Low Energy (BLE)) to track and/or locate various items, objects and/or individuals therein. For example, a conventional RFID or BLE locationing system can track and/or locate items, objects and/or individuals as they traverse the venue via a plurality of receivers (e.g., RFID readers or BLE gateways) that receive data (e.g., angle of arrival data) from transmitters (e.g., an RFID tag, an ultra-wideband (UWB) tag, or BLE beacon) associated with the items, objects and/or individuals. Conventional RFID or BLE locationing systems can determine a specific location of an item, object and/or individual by processing the angle of arrival data and utilizing triangulation/trilateration techniques. These systems can be cost prohibitive because they require significant infrastructure (e.g., several receivers positioned throughout a venue), data and computational resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
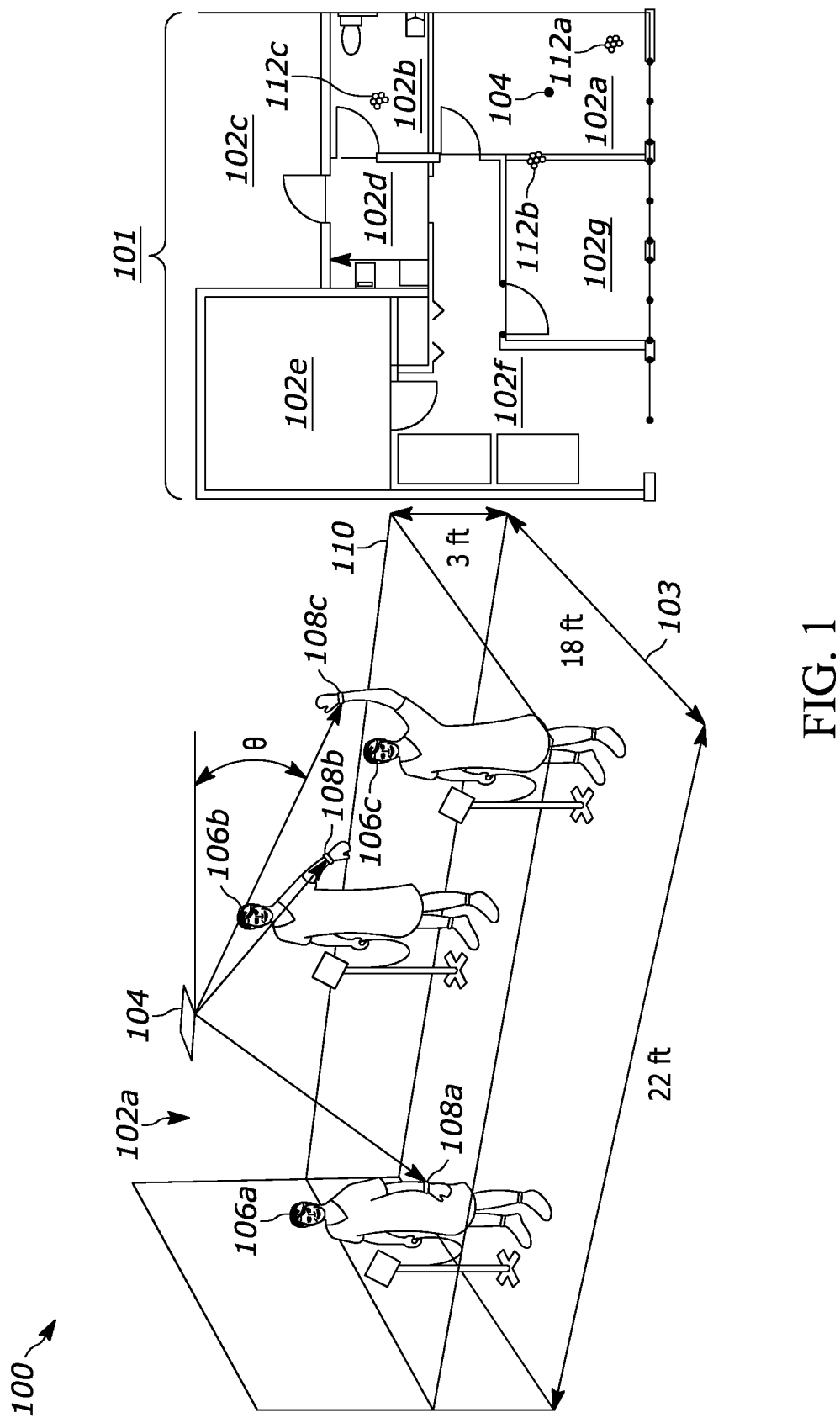
FIG. 1 is a diagram illustrating challenges with a conventional locationing system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As mentioned above, conventional RFID or BLE locationing systems can determine a specific location of an item, object and/or individual by processing angle of arrival data and utilizing triangulation/trilateration techniques. These systems can be cost prohibitive because they require significant infrastructure (e.g., several receivers positioned throughout a venue), data and computational resources.

Another conventional approach, utilizes a single piece of infrastructure (e.g., a single receiver) to capture and process angle of arrival data. However, given the lack of additional angle of arrival data received by another receiver, this system utilizes a fixed height (e.g., a height above a floor) for respective transmitters to determine a specific location thereof. This can be problematic because a height of a transmitter can vary based on a use case, application, venue, etc. and even small variations from the fixed height can yield significant errors in determining a specific location of a transmitter.

Therefore, conventional systems suffer from a general lack of versatility because these systems cannot utilize a single receiver to automatically and dynamically determine a height of a transmitter to determine a position thereof in a venue. Overall, this lack of versatility causes conventional systems to provide underwhelming performance and reduce the efficiency of executing locationing operations.

Thus, it is an objective of the present disclosure to eliminate these and other problems with conventional systems and methods via systems and methods that can utilize a single receiver/transceiver to automatically and dynamically determine a height of a transmitter/transceiver to determine a position thereof in a venue. For example, the systems and methods of the present disclosure alleviate the issues present with conventional systems by determining a difference in height between a receiver/transceiver and at least one transmitter/transceiver based on a difference between a first pressure measurement of a first sensor of the receiver/transceiver and a second pressure measurement of a second sensor of the at least one transmitter/transceiver; generating a vector between the receiver/transceiver and the at least one transmitter/transceiver based on angle of arrival data; determining a plane indicative of a height of the at least one transmitter/transceiver based on the determined difference in height; and determining a position of the at least one transmitter/transceiver based on an intersection of the vector and the plane.

In accordance with the above, and with the disclosure herein, the present disclosure includes improvements in computer functionality or in improvements to other technologies at least because the present disclosure describes that, e.g., locationing systems, and their related various components, may be improved or enhanced with the disclosed dynamic system features and methods that provide more efficient tracking and locationing solutions for items, objects and/or individuals and improved monitoring and management of locationing operations for system administrators. That is, the present disclosure describes improvements in the functioning of a locationing system itself or "any other technology or technical field" (e.g., the field of distributed/commercial/industrial locationing information systems). For example, the disclosed dynamic system features and methods improve and enhance determining the location of an item, object and/or individual in a venue by introducing the automatic and dynamic determination of a height of a transmitter/transceiver to determine a location thereof in the venue. This improves the state of the art at least because previous systems are cost-prohibitive, error-prone, and inefficient as they lack the ability to utilize a single receiver/transceiver to automatically and dynamically determine a height of a transmitter/transceiver to determine a position thereof in a venue.

In addition, the present disclosure applies various features and functionality, as described herein, with, or by use of, a particular machine, e.g., a processor, a mobile device, a receiver/transceiver device (e.g., a RFID reader or a BLE gateway), a transmitter/transceiver device (e.g., a RFID tag, a UWB tag, or a BLE beacon) and/or other hardware components as described herein.

Moreover, the present disclosure includes specific features other than what is well-understood, routine, conventional activity in the field, or adding unconventional steps that demonstrate, in various embodiments, particular useful applications, e.g., controlling signal processing protocols of a receiver/transceiver device (e.g., an RFID reader or a BLE gateway) in connection with determining a height of a transmitter/transceiver device.

Accordingly, it would be highly beneficial to develop a system and method that can automatically and dynamically determine a height of a transmitter/transceiver to determine a position thereof in a venue. The systems and methods of the present disclosure address these and other needs.

In an embodiment, the present disclosure is directed to a method for determining a position of at least one element. The method comprises receiving, by a device having a first sensor, angle of arrival data from at least one element having a second sensor and receiving position information of the device within a room. The method determines a difference in height between the device and the at least one element based on a first pressure measurement of the first sensor of the device and a second pressure measurement of the second sensor of the at least one element. The method generates a vector between the device and the at least one element based on the angle of arrival data and determines a plane indicative of a height of the at least one element based on the determined difference in height between the device and the at least one element. The method determines a position of the at least one element based on an intersection of the vector and the plane.

In an embodiment, the present disclosure is directed to a system for determining a position of at least one element comprising a device having a first sensor, at least one element having a second sensor, one or more processors, and a non-transitory computer-readable memory coupled to the device, the at least one element, and the one or more processors. The memory stores instructions thereon that, when executed by the one or more processors, cause the one or more processors to: receive, by the first device, angle of arrival data from the at least one element, receive position information of the device within a room, determine a difference in height between the device and the at least one element based on a first pressure measurement of the first sensor of the device and a second pressure measurement of the second sensor of the at least one element, generate a vector between the device and the at least one element based on the angle of arrival data, determine a plane indicative of a height of the at least one element based on the determined difference in height between the device and the at least one element, and determine a position of the at least one element based on an intersection of the vector and the plane.

In an embodiment, the present disclosure is directed to a tangible machine-readable medium comprising instructions for determining a position of at least one element that, when executed, cause a machine to: receive, by a device having a first sensor, angle of arrival data from at least one element having a second sensor; receive position information of the device within a room; determine a difference in height between the device and the at least one element based on a first pressure measurement of the first sensor of the device and a second pressure measurement of the second sensor of the at least one element; generate a vector between the device and the at least one element based on the angle of arrival data; determine a plane indicative of a height of the at least one element based on the determined difference in height between the device and the at least one element; and determine a position of the at least one element based on an intersection of the vector and the plane.

Turning to the Drawings, FIG. 1 is a diagram illustrating challenges with a conventional locationing system 100. As shown in FIG. 1, an area 102a (e.g., a room of a venue) can include a receiver 104 that receives data from at least one transmitter 108 associated with a user 106. As shown in FIG. 1 and as discussed above, given a lack of additional data received by another receiver, the conventional system 100 cannot utilize triangulation/trilateration techniques. Therefore, the conventional system 100 utilizes a fixed height of three feet (denoted by plane 110) above a floor 103 of the room 102a for respective transmitters 108a-c to determine respective locations thereof in the room 102a. This can be problematic because a height of a transmitter 108 can vary and even small variations from the fixed height can yield significant errors in determining a specific location of a transmitter 108. For example, the floor plan 101 of the venue includes location data points 112a-c of respective transmitters 108a-c associated with respective users 106a-c and erroneously shows that user 106b is located in a shared wall of rooms 102a and 102g and that user 106c is located in room 102b. The erroneous location data points 112b and 112c are the result of variations from the fixed height of three feet denoted by the plane 110. For example, the transmitter 108b associated with location data points 112b is positioned above the plane 110 and the transmitter 108c associated with location data points 112c is positioned further above the plane 110.

Figure 2:
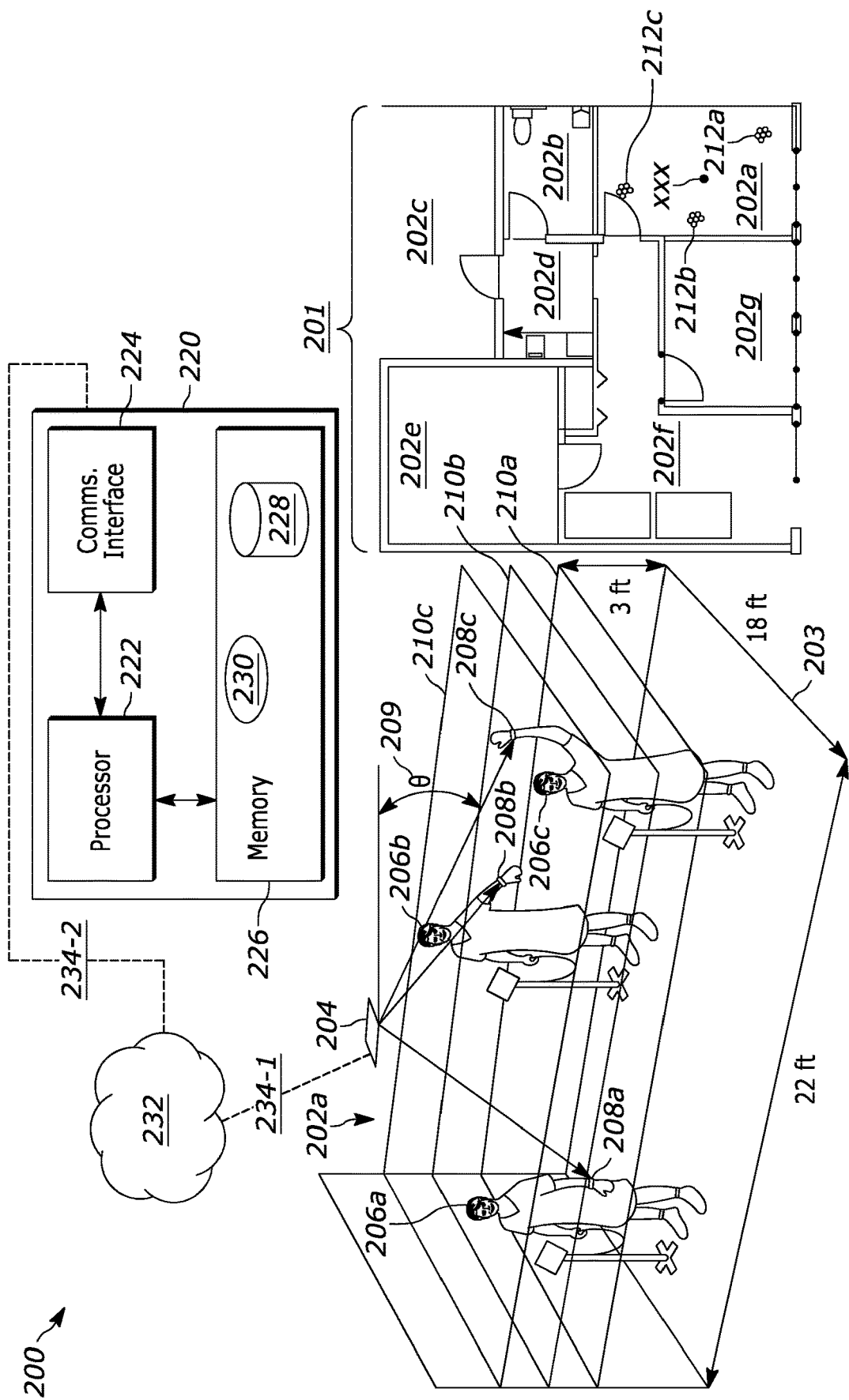
FIG. 2 is a diagram illustrating an embodiment of a system of the present disclosure for locationing.

FIG. 2 is a diagram illustrating an embodiment of a system 200 of the present disclosure for locationing. As shown in FIG. 2, an area 202a (e.g., a room of a venue including, but not limited to, a warehouse, a retail space, a hospital, a daycare, or the like) can include a receiver/transceiver 204 that receives data (e.g., angle of arrival data) from at least one transmitter/transceiver 208a-c (collectively referred to as transmitters/transceivers 208, and generically referred to as a transmitter/transceiver 208) associated with respective users 206a-c (collectively referred to as users 208, and generically referred to as a user 208).

The receiver/transceiver 204 can include, but is not limited to, an RFID reader and a BLE gateway. The receiver/transceiver 204 can be in a fixed overhead position of a room 202a (as shown) or a fixed position of a wall of the room 202a. The transmitter/transceiver 208 can include, but is not limited to, an RFID tag, a UWB tag, and BLE beacon. The receiver/transceiver 204 and the transmitter/transceiver 208 can communicate via any suitable communication protocol. The angle of arrival data can include at least one of an azimuth angle and an elevation angle as measured from the receiver/transceiver 204 to the transmitter/transceiver 208. For example, the angle θ 209 is indicative of an angle of elevation as measured from the receiver/transceiver 204 to the transmitter/transceiver 208c. The angle of arrival data can include a variety of angular directions (e.g., an angle in the X-direction and an angle in the Y-direction).

As described in greater detail below, the receiver/transceiver 204 can include a first sensor (e.g., a barometric pressure sensor) and each of the transmitter/transceivers 208 can include a second sensor (e.g., a barometric pressure sensor). Each of the first and second sensors can be a TDK InvenSense microelectromechanical systems (MEMs) barometric pressure sensor. For example, the pressure sensor can be a TDK InvenSense MEMs ICP-10100 which provides a pressure sensing accuracy of +/−1 Pa (or better) which corresponds to +/−8 cm (or better). In this way, the system 200 can determine a difference in height between the receiver/transceiver 204 and at least one transmitter/transceiver 208. For example, the system 200 can determine planes 210a-c (collectively referred to as planes 210, and generically referred to as a plane 210) indicative of heights (e.g., the determined differences in height between the receiver/transceiver 204 and transmitters/transceivers 208a-c) of the respective transmitters/transceivers 208a-c based on a difference between a first pressure measurement of the first sensor of the receiver/transceiver 204 and a second pressure measurement of a second sensor of the respective transmitters/transceivers 208a-c.

The system 200 includes a computing device 220. The computing device 220 includes, or is communicatively coupled with, the receiver/transceiver 204 and the transmitters/transceivers 208. For example, the computing device 220 can be communicatively coupled with the receiver/transceiver via communication links 234-1 and 234-2 of a network 232 (e.g., implemented as any suitable combination of local and wide-area networks). The computing device 220 also includes a processor 222, a communications interface 224, and a memory 226 storing a database 228 and a plurality of computer-readable instructions, e.g., in the form of a locationing application 228 executable by the processor 222 to perform functionality discussed in greater detail below.

The system 200 can determine a difference in height between the receiver/transceiver 204 and at least one transmitter/transceiver 208 based on a difference between a first pressure measurement of the first sensor of the receiver/transceiver 204 and a second pressure measurement of a second sensor of at least one transmitter/transceiver 208; generate a vector between the receiver/transceiver 204 and the at least one transmitter/transceiver 208 based on angle of arrival data; determine a plane 210 indicative of a height of the at least one transmitter/transceiver 208 based on the determined difference in height; and determine a position of the at least one transmitter/transceiver 208 based on an intersection of the vector and the plane. For example, a floor plan 201 of the venue includes location data points 212a-c (collectively referred to as location data points 212, and generically referred to as a location data point 212) of respective transmitters 208a-c associated with respective users 206a-c and shows that each user 208a, 208b and 208c is located in the room 202a.

FIG. 2 is only one potential configuration, and the system 200 of the present disclosure can be implemented using a number of different configurations. For example, the receiver/transceiver 204 could include the components of the computing device 220 and perform the functionality thereof.

Figure 3:
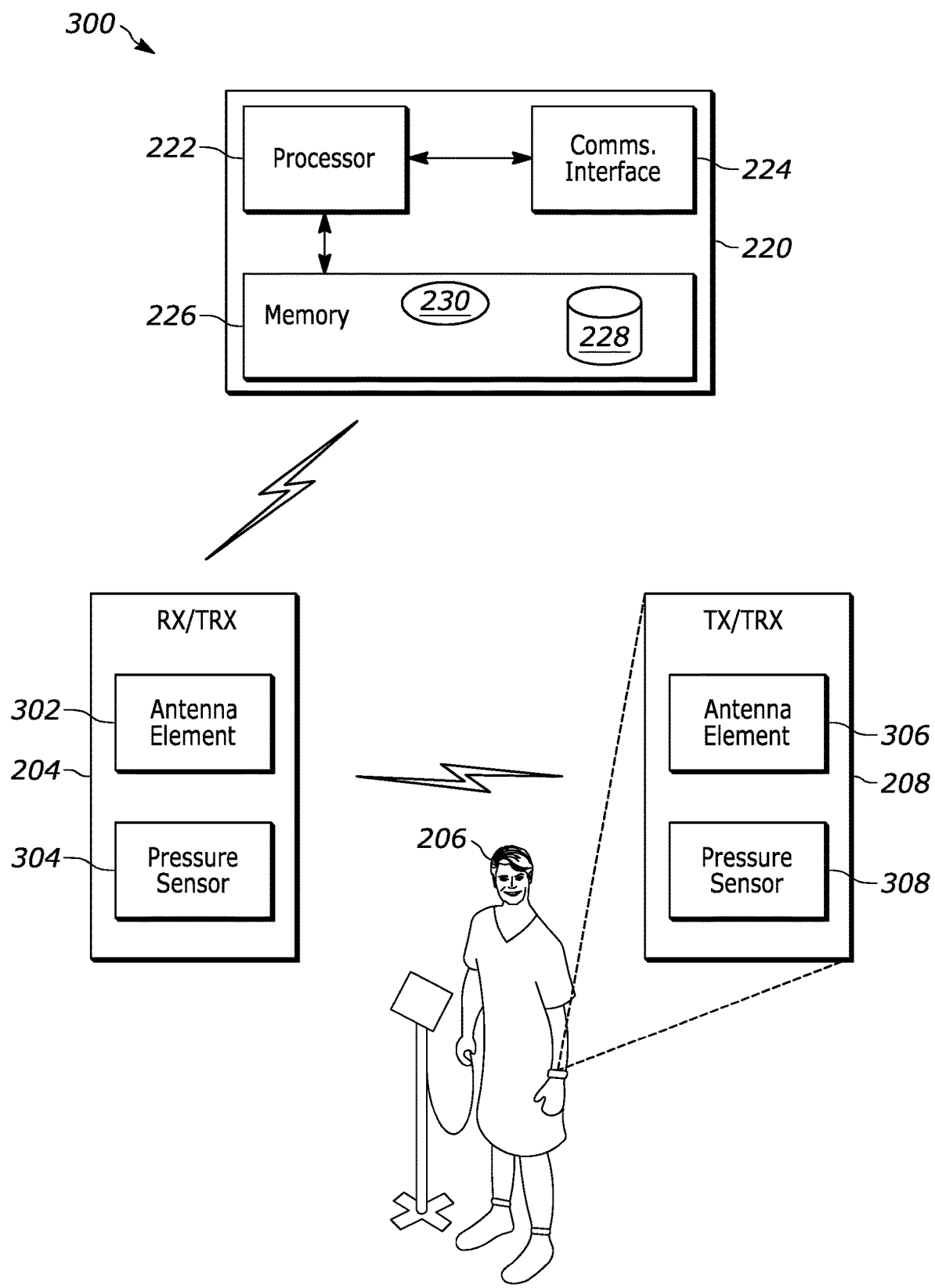
FIG. 3 is a diagram illustrating components of the system of FIG. 2.

FIG. 3 is a diagram 300 illustrating components of the system 200 of FIG. 2. As mentioned above, the system 200 can include a receiver/transceiver 204, a transmitter/transceiver 208 and a computing device 220. The computing device 220 can include, or can be communicatively coupled with, the receiver/transceiver 204 and the transmitter/transceiver 208. As illustrated in FIG. 3, the computing device 220 includes a processor 222, such as a central processing unit (CPU), a graphics processing unit (GPU), or a combination thereof. The processor 222 is communicatively coupled with a non-transitory computer-readable storage medium such as a memory 226, implemented as a suitable combination of volatile and non-volatile memory elements. The memory 226 can store a database 228 and a plurality of computer-readable instructions, e.g., in the form of a locationing application 230 executable by the processor 222 to perform functionality discussed in greater detail below. The application 230, in other examples, can be implemented as a suite of distinct applications, or as a dedicated hardware element (e.g., an application-specific integrated circuit (ASIC)).

The computing device 220 also includes a communications interface 224 enabling communication between the device 220 and other devices (e.g., receiver/transceiver 204 and/or the transmitter/transceiver 208), via suitable short-range links, networks such as the network 232, and the like. The interface 224 therefore includes suitable hardware elements, executing suitable software and/or firmware, to communicate over the network 232 and/or other communication links.

The computing device 220 includes, or is otherwise communicatively coupled with, the receiver/transceiver 204 such as an RFID reader or BLE gateway and at least one transmitter/transceiver 208 such as an RFID tag, a UWB tag, or a BLE beacon. A receiver/transceiver 204 can be disposed at a fixed position on a ceiling, wall, or at any suitable location of a venue or area (e.g., a room) thereof. A receiver/transceiver 204 can include, for example, a directional reader configured to detect a transmitter/transceiver 208 affixed to an item, object and/or individual. The transmitter/transceiver 208 can uniquely distinguish each item, object and/or individual.

Each of the receiver/transceiver 204 and transmitter/transceiver 208 include a plurality of sensors and components to facilitate tracking and/or locating an item, object, and/or individual. As shown in FIG. 3, the receiver/transceiver 204 can include an antenna element 302 and a pressure sensor 304 and the transmitter/transceiver 208 can include an antenna element 306 and a pressure sensor 308. As mentioned above, each of the pressure sensor 304 and pressure sensor 308 can be a TDK InvenSense microelectromechanical systems (MEMs) barometric pressure sensor. For example, the pressure sensors 304, 308 can be a TDK InvenSense MEMs ICP-10100 which provides a pressure sensing accuracy of +/−1 Pa (or better) which corresponds to +/−8 cm (or better). In this way, the system 200 can determine a difference in height between the receiver/transceiver 204 and at least one transmitter/transceiver 208. For example, the system 200 can determine a plane indicative of a height of a transmitter/transceiver 208 based on a difference between a first pressure measurement of the pressure sensor 304 of the receiver/transceiver 204 and a second pressure measurement of the pressure sensor 308 of the transmitter/transceiver 208.

The plurality of sensors and components can also include any one of, or any suitable combination of, additional sensors and components configured to facilitate tracking and/or locating of an item, object, and/or individual. For example, the plurality of sensors and components can include, but is not limited to, an accelerometer, a gyroscope, a wireless communication interface, or the like.

FIG. 3 is only one potential configuration, and the system 200 of the present disclosure can be implemented using a number of different configurations. For example, the receiver/transceiver 204 can include the components of the computing device 220 and perform the functionality thereof.

Figure 4:
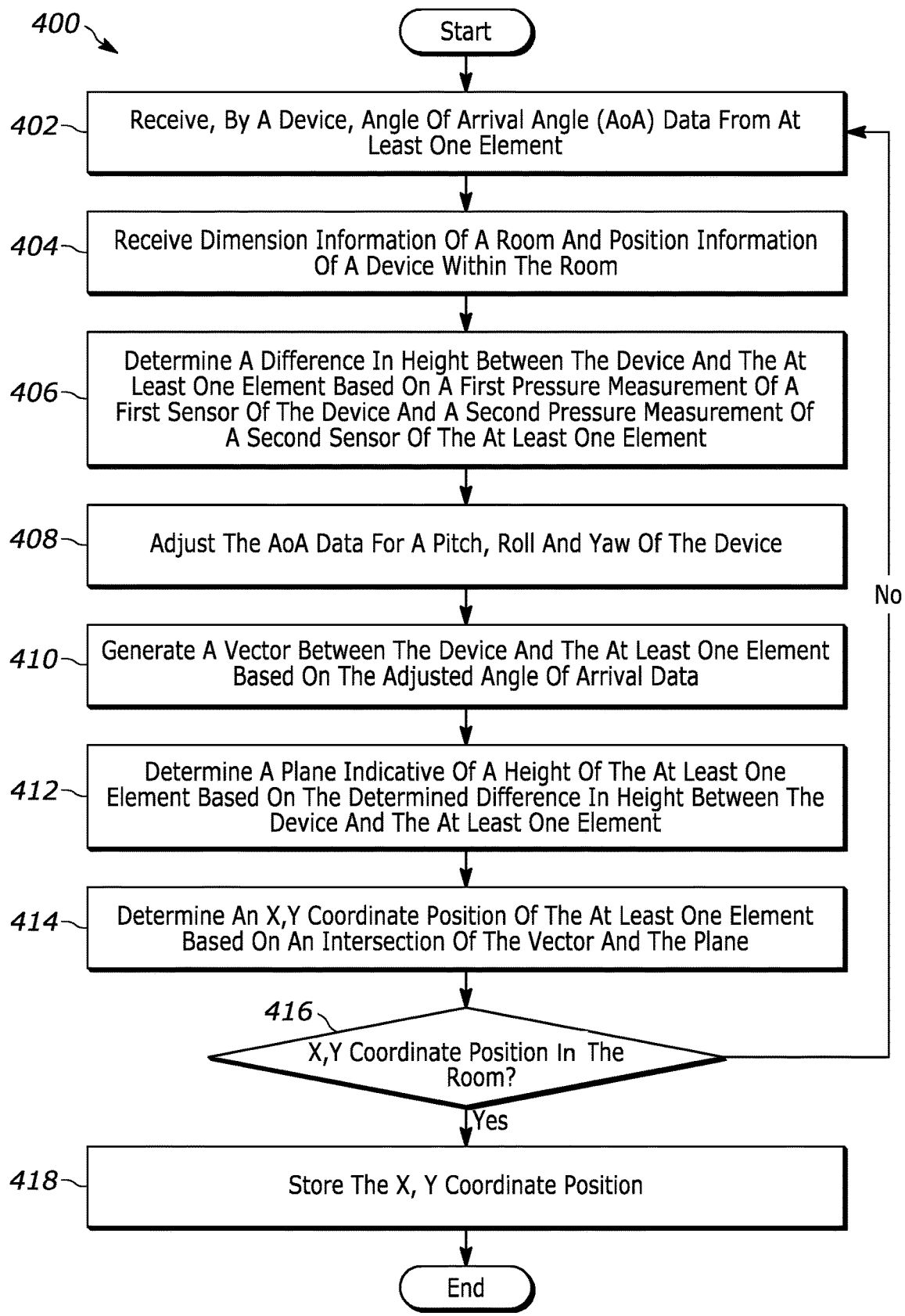
FIG. 4 is a flowchart illustrating processing steps carried out by an embodiment of the system of the present disclosure.

FIG. 4 is a flowchart illustrating processing steps carried out by an embodiment of the system of the present disclosure. The processing steps will be described in conjunction with their performance in the system 200 (e.g., by the computing device 220 in conjunction with the receiver/transceiver 204 and the transmitter/transceiver 208). In general, via performance of the processing steps, the system 200 can automatically and dynamically determine a height of a transmitter/transceiver 208 to determine a position thereof in a venue. For example, the system 200 can determine a difference in height between the receiver/transceiver 204 and at least one transmitter/transceiver 208 based on a difference between a first pressure measurement of a first pressure sensor 304 of the receiver/transceiver 204 and a second pressure measurement of a second pressure sensor 308 of the at least one transmitter/transceiver 208; generate a vector between the receiver/transceiver 204 and the at least one transmitter/transceiver 208 based on angle of arrival data; determine a plane 210 indicative of a height of the at least one transmitter/transceiver 208 based on the determined difference in height; and determine a position of the at least one transmitter/transceiver 208 based on an intersection of the vector and the plane.

Beginning in step 402, the system 200 receives angle of arrival data. For example, the receiver/transceiver 204 receives, from at least one transmitter/transceiver 208, at least one of an azimuth angle and an elevation angle as measured from the receiver/transceiver 204 to the transmitter/transceiver 208. In step 404, the system 200 receives dimension information of a venue and/or room thereof and position information of a receiver/transceiver 204 positioned within the venue and/or room. The dimension information can include a width, length and/or height of a venue and/or a room thereof. The position information can be a three-dimensional coordinate position of a receiver/transceiver 204 fixed to a ceiling or wall of the venue and/or room thereof.

In step 406, the system 200 determines a difference in height between the receiver/transceiver 204 and at least one transmitter/transceiver 208 based on a difference in pressure measurements of the receiver/transceiver 204 and the at least one transmitter/transceiver 208. For example, the system 200 can determine a difference in height between the receiver/transceiver 204 and the at least one transmitter/transceiver 208 based on a difference between a first pressure measurement of the pressure sensor 304 of the receiver/transceiver 204 and a second pressure measurement of the pressure sensor 308 of the transmitter/transceiver 208. Then, in step 408, the system 200 can adjust the angle of arrival data based on a pitch, roll and yaw of the receiver/transceiver 204. In step 410, the system can generate a vector between the receiver/transceiver 204 and the transmitter/transceiver 208 based on the adjusted angle of arrival data.

In step 412, the system 200 can determine a plane (e.g., an X, Y plane) indicative of a height of the transmitter/transceiver 208 based on the determined difference in height between the receiver/transceiver 204 and at least one transmitter/transceiver 208. In step 414, the system 200 can determine an X, Y coordinate position of the at least one transmitter/transceiver 208 based on an intersection of the vector and plane. Then, in step 416, the system 200 determines whether the X, Y coordinate position is located within the venue and/or room thereof based on the received dimension information of the venue and/or room. If the system 200 determines that the X, Y coordinate position is located in the venue and/or room thereof, then the process proceeds to step 418. In step 418, the system 200 stores the X, Y coordinate position in a database (e.g., database 228) thereof. If the system 200 determines that the X, Y coordinate position is not located in the venue and/or room thereof, then the process returns to step 402. In an embodiment, the system 200 can store an X, Y coordinate position that is not located in the venue and/or room thereof for further processing and/or analysis including, but not limited to, training datasets, feedback, or the like.

FIG. 4 is only one potential process configuration, and the system 200 of the present disclosure can be implemented using several different process configurations (e.g., sequences of steps). For example, the system 200 can receive the dimension information of the venue and/or room thereof earlier or later than step 404 of FIG. 4. In another example, the system 200 can store an X, Y coordinate position that is not located in the venue and/or room thereof.

As mentioned above, the present disclosure can eliminate problems with conventional locationing systems and methods via systems and methods that can utilize a single receiver/transceiver to automatically and dynamically determine a height of a transmitter/transceiver to determine a position thereof in a venue. For example, the systems and methods of the present disclosure alleviate the issues present with conventional systems by determining a difference in height between a receiver/transceiver and at least one transmitter/transceiver based on a difference between a first pressure measurement of a first sensor of the receiver/transceiver and a second pressure measurement of a second sensor of the at least one transmitter/transceiver; generating a vector between the receiver/transceiver and the at least one transmitter/transceiver based on angle of arrival data; determining a plane indicative of a height of the at least one transmitter/transceiver based on the determined difference in height; and determining a position of the at least one transmitter/transceiver based on an intersection of the vector and the plane.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:
1. A method for determining a position of at least one element, comprising:
receiving, by a device having a first sensor, angle of arrival data from at least one element having a second sensor;
receiving position information of the device within a room, the device being in a fixed overhead position of the room;
determining a difference in height between the device and the at least one element based on a first pressure measurement of the first sensor of the device and a second pressure measurement of the second sensor of the at least one element;
generating a vector between the device and the at least one element based on the angle of arrival data;
determining a plane indicative of a height of the at least one element based on the determined difference in height between the device and the at least one element; and
determining a position of the at least one element based on an intersection of the vector and the plane.

2. The method of claim 1, wherein determining the difference in height between the device and the at least one element based on the first pressure measurement of the first sensor of the device and the second pressure measurement of the second sensor of the at least one element comprises determining a difference in pressure between the first pressure measurement and the second pressure measurement.

3. The method of claim 1, further comprising
adjusting the angle of arrival data based on a pitch, roll and yaw of the device; and
generating the vector between the device and the at least one element based on the adjusted angle of arrival data.

4. The method of claim 1, further comprising
receiving dimension information of the room;
determining whether the at least one element is positioned within the room based on the determined position; and
storing the determined position when the at least one element is positioned within the room.

5. The method of claim 1, wherein
the angle of arrival data is indicative of at least one of an azimuth angle and an elevation angle from the device to the at least one element, and
the position of the at least one element is an X, Y coordinate position.

6. The method of claim 1, wherein
the device is one of a radio frequency identification (RFID) reader and a Bluetooth Low Energy (BLE) gateway,
the at least one element is one of a radio frequency identification (RFID) tag, an ultra wideband (UWB) tag, and a Bluetooth Low Energy (BLE) beacon, and
each of the first sensor and the second sensor is a barometric pressure sensor.

7. A system for determining a position of at least one element, comprising,
a device having a first sensor;
at least one element having a second sensor;
one or more processors; and
a non-transitory computer-readable memory coupled to the device, the at least one element, and the one or more processors, the memory storing instructions thereon that, when executed by the one or more processors, cause the one or more processors to:
receive, by the device, angle of arrival data from the at least one element, receive position information of the device within a room, the device being in a fixed overhead position of the room, determine a difference in height between the device and the at least one element based on a first pressure measurement of the first sensor of the device and a second pressure measurement of the second sensor of the at least one element, generate a vector between the device and the at least one element based on the angle of arrival data, determine a plane indicative of a height of the at least one element based on the determined difference in height between the device and the at least one element, and determine a position of the at least one element based on an intersection of the vector and the plane.

8. The system of claim 7, wherein the instructions, when executed, further cause the one or more processors to:

determine the difference in height between the device and the at least one element based on a difference in pressure between the first pressure measurement and the second pressure measurement.

9. The system of claim 7, wherein the instructions, when executed, further cause the one or more processors to:

adjust the angle of arrival data based on a pitch, roll and yaw of the device, and generate the vector between the device and the at least one element based on the adjusted angle of arrival data.

10. The system of claim 7, wherein the instructions, when executed, further cause the one or more processors to:

receive dimension information of the room;

determine whether the at least one element is positioned within the room based on the determined position; and store the determined position when the at least one element is positioned within the room.

11. The system of claim 7, wherein the angle of arrival data is indicative of at least one of an azimuth angle and an elevation angle from the device to the at least one element, and the position of the at least one element is an X, Y coordinate position.

12. The system of claim 7, wherein the device is one of a radio frequency identification (RFID) reader and a Bluetooth Low Energy (BLE) gateway, the at least one element is one of a radio frequency identification (RFID) tag, an ultra wideband (UWB) tag, and a Bluetooth Low Energy (BLE) beacon, and each of the first sensor and the second sensor is a barometric pressure sensor.

13. A tangible machine-readable medium comprising instructions for determining a position of at least one element that, when executed, cause a machine to:

receive, by a device having a first sensor, angle of arrival data from at least one element having a second sensor;

receive position information of the device within the room, the device being in a fixed overhead position of the room;

determine a difference in height between the device and the at least one element based on a first pressure measurement of the first sensor of the device and a second pressure measurement of the second sensor of the at least one element;

generate a vector between the device and the at least one element based on the angle of arrival data;

determine a plane indicative of a height of the at least one element based on the determined difference in height between the device and the at least one element; and determine a position of the at least one element based on an intersection of the vector and the plane.

14. The tangible machine-readable medium of claim 13, wherein the instructions, when executed, further cause the machine to:

determine the difference in height between the device and the at least one element based on a difference in pressure between the first pressure measurement and the second pressure measurement.

15. The tangible machine-readable medium of claim 13, wherein the instructions, when executed, further cause the machine to:

adjust the angle of arrival data based on a pitch, roll and yaw of the device; and generate the vector between the device and the at least one element based on the adjusted angle of arrival data.

16. The tangible machine-readable medium of claim 13, wherein the instructions, when executed, further cause the machine to:

receive dimension information of the room;

determine whether the at least one element is positioned within the room based on the determined position; and store the determined position when the at least one element is positioned within the room.

17. The tangible machine-readable medium of claim 13, wherein the angle of arrival data is indicative of at least one of an azimuth angle and an elevation angle from the device to the at least one element, and the position of the at least one element is an X, Y coordinate position.

18. The tangible machine-readable medium of claim 13, wherein the device is one of a radio frequency identification (RFID) reader and a Bluetooth Low Energy (BLE) gateway, the at least one element is one of a radio frequency identification (RFID) tag, an ultra wideband (UWB) tag, and a Bluetooth Low Energy (BLE) beacon, and each of the first sensor and the second sensor is a barometric pressure sensor.

* * * * *